(12) United States Patent
Thielman et al.

(10) Patent No.: US 8,208,005 B2
(45) Date of Patent: Jun. 26, 2012

(54) SYSTEM AND METHOD OF DETERMINING THE IDENTITY OF A CALLER IN A VIDEOCONFERENCING SYSTEM

(75) Inventors: Jeffrey Thielman, Corvallis, OR (US); Thomas G. Acevedo, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1365 days.

(21) Appl. No.: 11/831,641

(22) Filed: Jul. 31, 2007

(65) Prior Publication Data

US 2009/0033738 A1 Feb. 5, 2009

(51) Int. Cl.
*H04N 7/14* (2006.01)
(52) U.S. Cl. .................................. 348/14.1; 381/14.08
(58) Field of Classification Search .... 348/14.01–14.03, 348/14.05, 14.07, 14.08–14.09
See application file for complete search history.

(56) References Cited

U.S. PATENT DOCUMENTS

| | | | |
|---|---|---|---|
| 4,965,819 A | 10/1990 | Kannes | |
| 5,627,825 A | 5/1997 | Barraclough et al. | |
| 5,758,079 A | 5/1998 | Ludwig et al. | |
| 6,894,714 B2 | 5/2005 | Gutta et al. | |
| 6,963,352 B2 | 11/2005 | Whynot et al. | |
| 7,139,807 B2 | 11/2006 | Comstock et al. | |
| 8,019,175 B2 * | 9/2011 | Lee et al. | 348/14.08 |
| 2002/0093531 A1 | 7/2002 | Barile | |
| 2004/0003040 A1 | 1/2004 | Beavers et al. | |
| 2004/0080610 A1 | 4/2004 | James et al. | |
| 2004/0263611 A1 | 12/2004 | Cutler | |
| 2005/0140779 A1 | 6/2005 | Schulz et al. | |
| 2006/0087987 A1 | 4/2006 | Witt et al. | |
| 2006/0117264 A1 | 6/2006 | Beaton et al. | |
| 2006/0118636 A1 | 6/2006 | Miles et al. | |
| 2006/0206560 A1 | 9/2006 | Kanada | |
| 2006/0215016 A1 | 9/2006 | Cohen et al. | |
| 2006/0244815 A1 | 11/2006 | Barreiro | |
| 2006/0251384 A1 | 11/2006 | Vronay et al. | |

FOREIGN PATENT DOCUMENTS

| | | |
|---|---|---|
| WO | WO-9959337 | 11/1999 |
| WO | WO-0007371 | 2/2000 |
| WO | WO-0182626 | 1/2001 |
| WO | WO-0247386 | 6/2002 |

* cited by examiner

*Primary Examiner* — Suhan Ni

(57) ABSTRACT

A system and method of determining the identity of a caller in a local room from a remote room includes a local image capture device for capturing a plurality of images of a caller in the local room in real time. A remote codec receives the plurality of images of the caller. A remote viewscreen displays the plurality of images of the caller in real time in the remote room. A remote display monitor displays the plurality of images in real time after two-way communication is established between the local room and the remote room. The method includes establishing one-way communication between the local room and the remote room, transmitting the plurality of images of the caller to the remote room, displaying the plurality of images of the caller in real time on the remote viewscreen, and establishing two-way communication between the local room and the remote room.

23 Claims, 4 Drawing Sheets

SYSTEM AND METHOD OF DETERMINING THE IDENTITY OF A CALLER IN A VIDEOCONFERENCING SYSTEM

BACKGROUND

Videoconferencing systems provide a unique aspect to the telecommunication industry—the ability to instantly communicate face-to-face with anybody in the world without requiring either of the participants to travel hundreds or thousands of miles to participate. Videoconferencing systems generally include a local room from which a call originates and a remote room that receives the call. The local room and the remote room are in communication with one another through a network, such as a telephone network. As a caller places a call in the local room, the network connects the remote room to the local room such that one-way communication is established. During one-way communication, identifying information, such as a telephone number or calling location, only travels from the local room to the remote room.

When one-way communication is established, a call receiver (i.e., a person receiving the call in the remote room) receives a message on a remote display monitor that indicates that the caller in the local room would like to establish two-way communication. The call receiver is then prompted to either accept or deny the call. However, the call receiver does not necessarily know the identity of the caller. The call receiver only knows that that someone in the local room would like to connect to the remote room. The call receiver may be able to view the telephone number of the local room, but this alone does not necessarily identify the caller.

Therefore, a videoconferencing system is needed that allows the call receiver to identify the caller by viewing a plurality of images of the caller in real time before accepting the call and establishing two-way communication.

DETAILED DESCRIPTION

Figure 1:
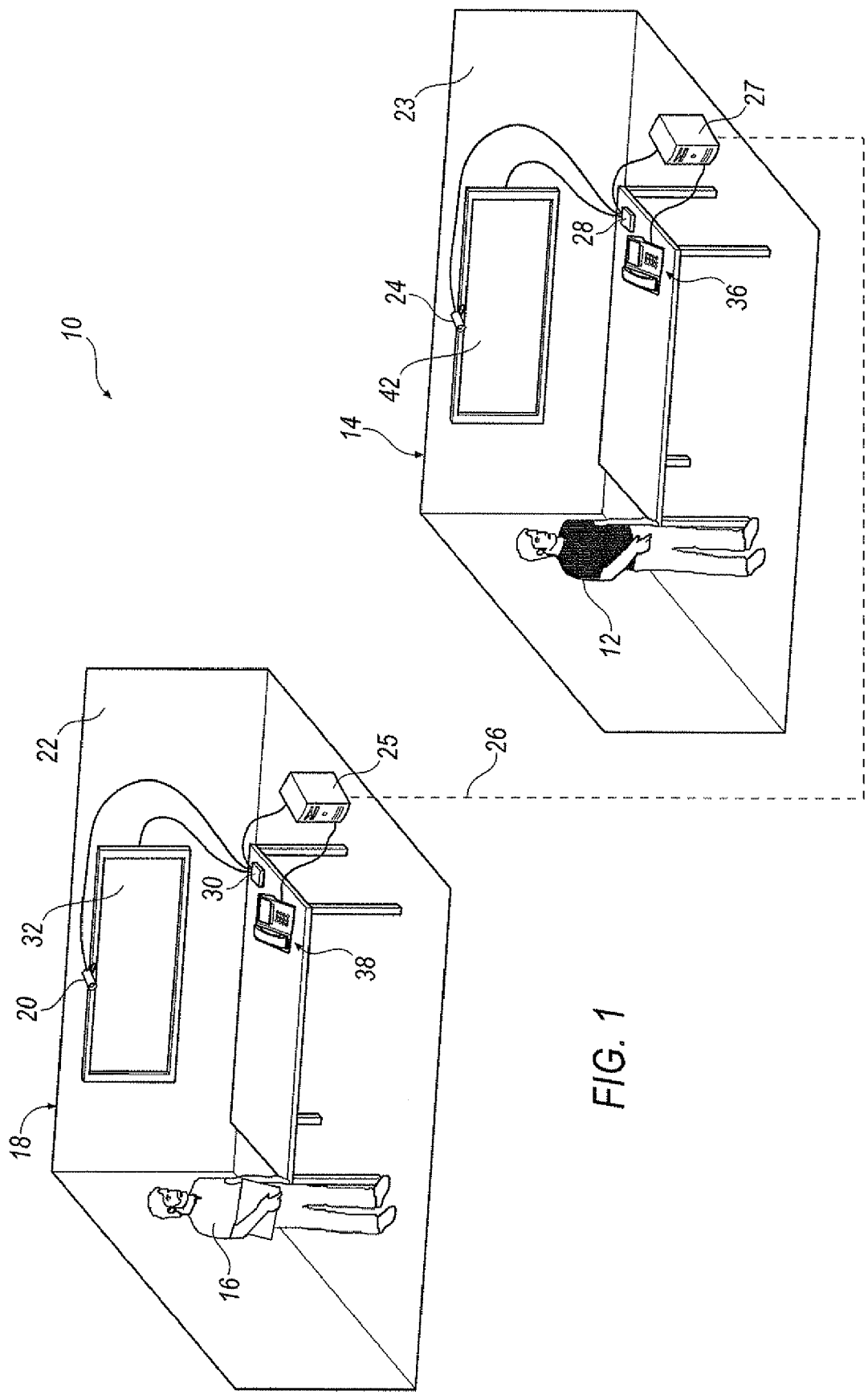
FIG. 1 is a diagram of a videoconferencing system according to an embodiment.

A system and method of determining the identity of a caller before accepting a call in a videoconferencing system is provided. The system and method provide for establishing one-way communication between a local room and a remote room before establishing two-way communication. To initiate one-way communication, a caller in the local room places a call to a call receiver in the remote room. A plurality of images of the caller are transmitted from a local image capture device to the remote room. The plurality of images of the caller are displayed in real time on a remote viewscreen located in the remote room. At this time, the call receiver may choose to accept or deny the call. By accepting the call, two-way communication is established between the local room and the remote room. Once two-way communication is established, the plurality of images of the caller are transferred from the remote viewscreen to a remote display monitor disposed in the remote room. Likewise, a remote image capture device captures a plurality of images of the call receiver, and the plurality of images of the call receiver are viewed in real time by the caller on a local display monitor disposed in the local room FIG. 1 illustrates an exemplary embodiment of a videoconferencing system shown generally at numeral 10. The videoconferencing system 10 may be used by a call receiver 12 located in a remote room 14 to establish communication with a caller 16 located in a local room 18. It is to be understood that either the caller 16 or the call receiver 12 may be a single person or a group of persons. It is also to be understood that the videoconferencing system 10 may allow for any number of local rooms and remote rooms.

The videoconferencing system 10 includes a local image capture device 20 for capturing a plurality of images of the caller 16 in the local room 18 in real time. When viewed in real time, the plurality of images of the caller 16 are displayed in rapid succession to generate a live video of the caller 16. The local image capture device 20 may be any image capture device known in the art. For instance, the local image capture device 20 may be a camera mounted to a wall 22 of the local room 18. The videoconferencing system 10 also includes a remote image capture device 24 for capturing a plurality of images of the call receiver 12 in the remote room 14 once two-way communication is established. Like the local image capture device 20, the remote image capture device 24 may be a camera mounted to a wall 23 of the remote room 14. A network 26 is in communication with the local image capture device 20 and the remote image capture device 24 via a local room server 25 and a remote room server 27, respectively, although it is to be understood that the local image capture device 20 and the remote image capture device 24 may connect to the network 26 directly. The network 26 transmits the plurality of images of the caller 16 to the remote room 14. The network 26 may be any network 26 known in the art. For instance, the network 26 may be further defined as a telephone network or a computer network. As discussed in greater detail below, the remote room 14 may include a remote codec 28 in communication with the remote image capture device 24, and the local room 18 may include a local codec 30 in communication with the local image capture device 20. Both the remote codec 28 and the local codec 30 are in communication with the network 26 via the remote room server 27 and the local room server 25, respectively. A remote user interface 36, such as a telephone, may be disposed within the remote room 14. Likewise, a local user interface 38 may also be disposed within the local room 18. The local user interface 38 may also be a telephone or any device having a display.

Figure 2:
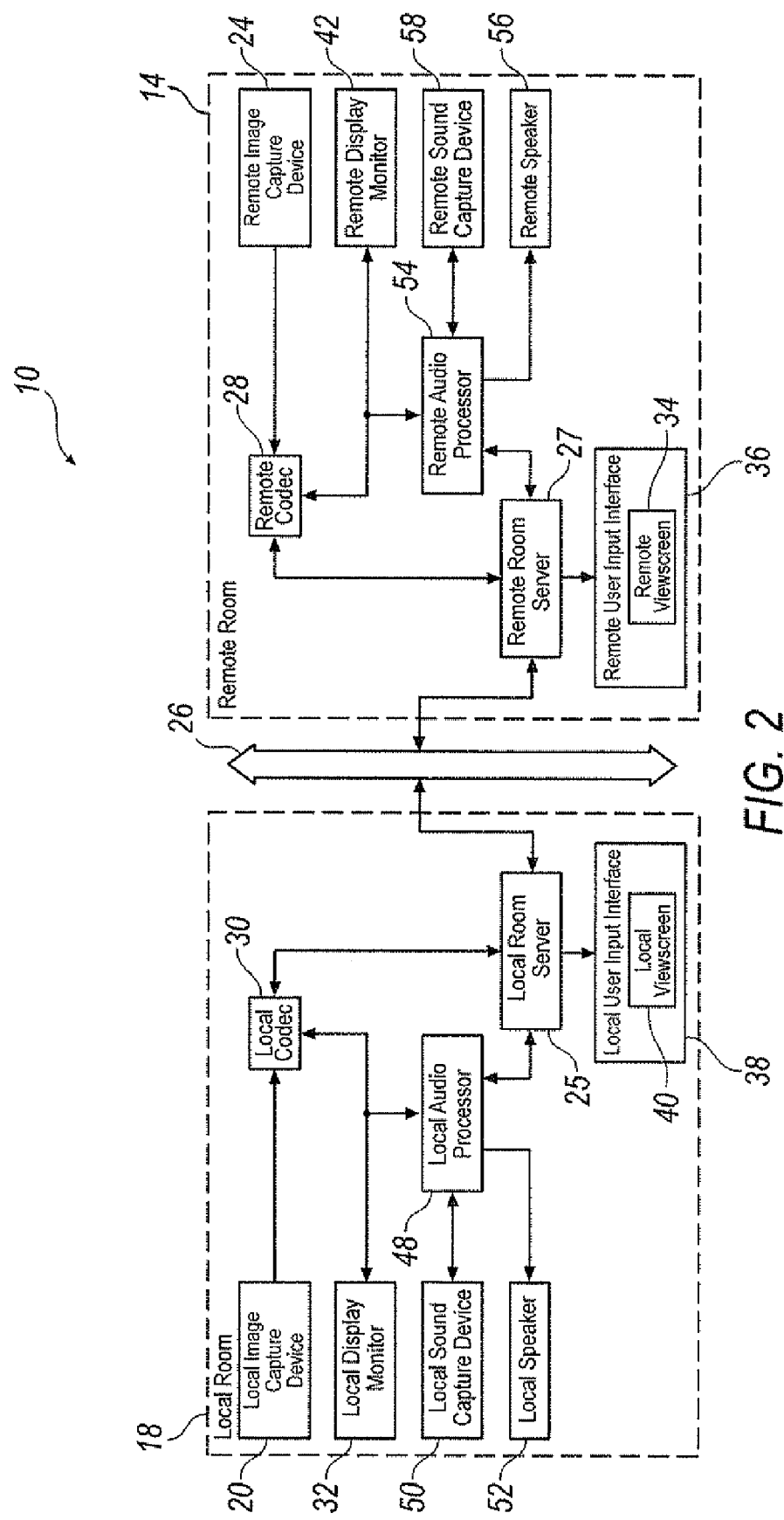
FIG. 2 is a communication schematic of the videoconferencing system of FIG. 1 according to an embodiment.

Referring now to FIG. 2, the remote codec 28 is in direct communication with the remote image capture device 24. The remote codec 28 is in communication with the network 26 via the remote room server 27. The remote codec 28 receives the plurality of images of the caller 16 from the local image capture device 20. Similarly, the local room 18 includes a local codec 30 in direct communication with the local image capture device 20. The local codec 30 is in communication with the network 26 via the local room server 25. In one embodiment, the remote codec 28 and the local codec 30 may include executable software programs stored on hard drives and run by dedicated processors in each of the remote room 14 and the local room 18, respectively. For instance, the remote codec 28 and the local codec 30 may be hardware codecs made by any known manufacturer. In another embodiment, it is to be appreciated that the remote codec 28 and the local codec 30 may be executable software programs stored in the remote capture device 24 and the local capture device 20, respectively. In yet another embodiment, the remote codec 28 and the local codec 30 may be executable software programs stored on the remote room server 27 and the local room server 25, respectively. In either of these embodiments, the remote codec 28 is in communication with the local image capture device 20 and the local codec 30, via the network 26. The local codec 30 is in communication with a local display monitor 32 either directly or via the local room server 25. In operation, the local codec 30 encodes the plurality of images of the caller 16 into a video signal, and the remote codec 28 decodes the video signal into the plurality of images of the caller 16. When two-way communication is established, the remote codec 28 encodes the plurality of images of the call receiver 12 captured by the remote image capture device 24 into a video signal, and the local codec 30 decodes the video signal into the plurality of images of the call receiver 12.

The remote room 14 further includes a remote viewscreen 34 in communication with the network 26 via the remote room server 27 for receiving the plurality of images of the caller 16 from the remote codec 28 and for displaying the plurality of images of the caller 16 in real time in the remote room 14. The remote viewscreen 34 may be disposed on the remote user interface 36 located in the remote room 14. For instance, the remote user interface 36 may be a telephone located in the remote room 14, although other devices may serve as the remote user interface 36. From the remote user interface 36, the call receiver 12 may accept the call from the caller 16. Similarly, the local room 18 may include a local viewscreen 40 in communication with the network 26. The local viewscreen 40 may be part of the local user interface 38. The local viewscreen 40 receives the plurality of images of the call receiver 12 from the local codec 30 and displays the plurality of images of the call receiver 12 in real time in the local room 18 when the caller 16 places a call from the remote room 14 to the local room 18. Like the remote user interface 36, the local user interface 38 may be a telephone or another device. The caller 16 may use the local user interface 38 to place a call to the remote room 14 or to record an audio message to transmit to the remote room 14.

The remote room 14 further includes a remote display monitor 42 in communication with the remote codes 28 for receiving the plurality of images of the caller 16 from the remote codec 28 and for displaying the plurality of images of the caller 16 in real time after two-way communication is established between the local room 18 and the remote room 14. In other words, once two-way communication is established, the plurality of images of the caller 16 are transferred from the remote viewscreen 34 to the remote display monitor 42. In another embodiment, the remote display monitor 42 may be connected to the remote codec 28 via the remote room server 27. The remote display monitor 42 may be any remote display monitor 42 known in the art. For instance, the remote display monitor 42 may be a CRT monitor, an LCD screen, or any other display device.

The local room server 25 is in communication with the local viewscreen 40 and may be used to process commands provided at the local user interface 38. For instance, the caller 16 may use the local user interface 38 to place the call to the remote room 14, while the local room server 25 communicates with the network 26 to establish one-way communication between the local room 18 and the remote room 14. Likewise, the remote room server 27 is in communication with the network 26 and the remote viewscreen 34. The remote room server 27 receives the plurality of images of the caller 16 from the network 26 and transmits the plurality of images to the remote viewscreen 34. In other words, the remote room server 27 enables the one-way communication between the local room 18 and the remote room 14. When the call receiver 12 accepts the call, the remote room 14 sever communicates with the local room server 25 to establish two-way communication.

The videoconferencing system 10 may include a local audio processor 48 in communication with the local codec 30 and the local room server 25. The local audio processor 48 is in communication with a local sound capture device 50, such as a microphone or any other sound capture device known in the art, and a local speaker 52. The local audio processor 48 receives an audio message from the caller 16 via the local sound capture device 50. The local codec 30 converts the audio message to a sound signal to be transmitted via the network 26 to the remote room 14. The remote room 14 includes a remote audio processor 54 in communication with the remote codec 28 and the remote room server 27. The remote codec 28 decodes the sound signal into the audio message and the remote audio processor 54 plays the audio message on a remote speaker 56 located in the remote room 14 and in communication with the remote room 14 speaker. The remote room 14 further includes a remote sound capture device 58 in communication with the remote audio processor 54 for capturing sounds in the remote room 14 after two-way communication is established between the local room 18 and the remote room 14. The remote codec 28 is able to encode the sounds captured in the remote room 14 and transmit the sounds to the local room 18.

Figure 3:
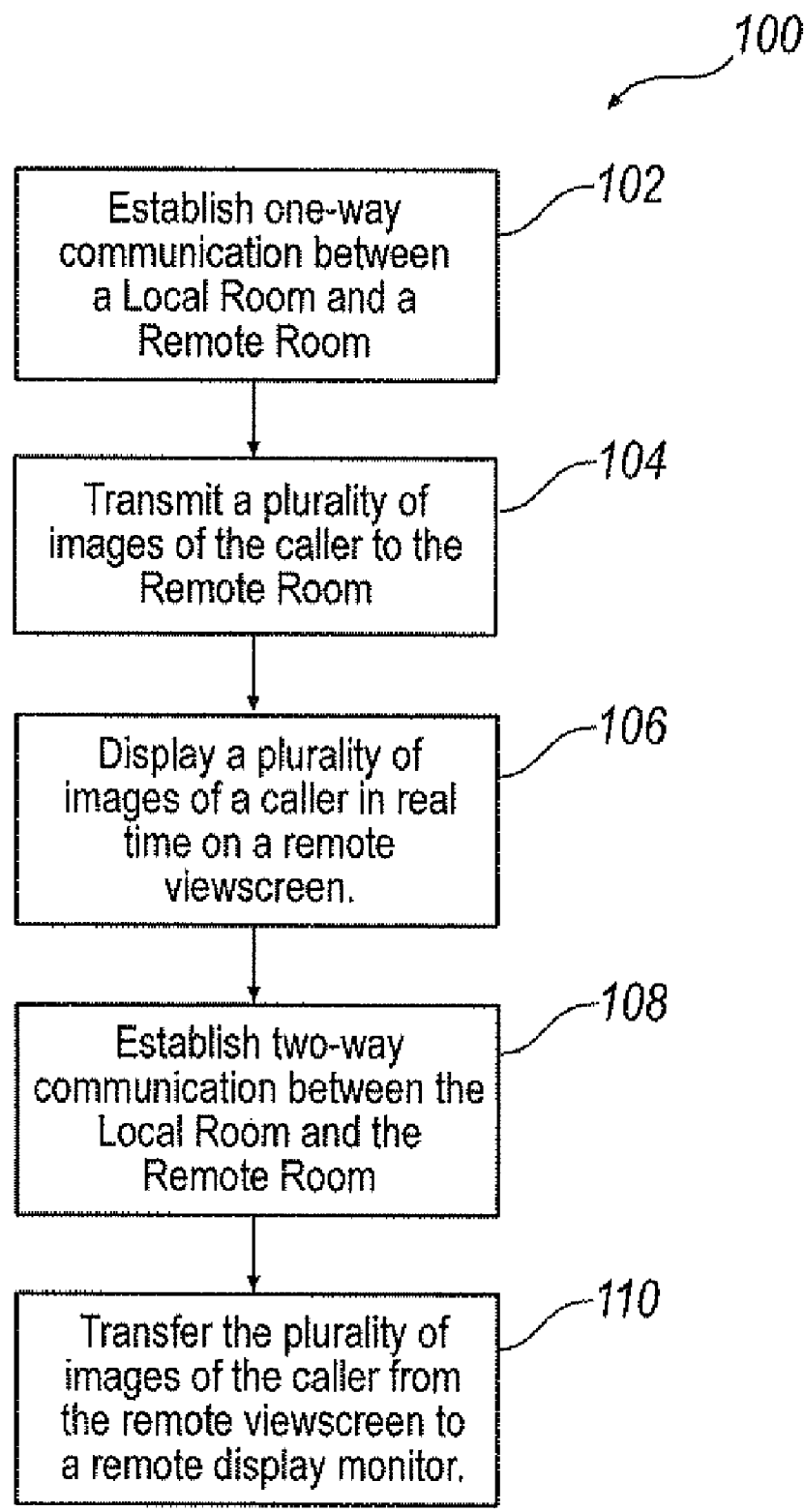
FIG. 3 is a flowchart of a method of determining the identity of a caller according to an embodiment.

Referring now to FIG. 3, a method 100 of determining the identity of the caller 16 in the local room 18 using the plurality of images of the caller 16 and the remote viewscreen 34 is provided. The method includes a step 102 of establishing one-way communication between the local room 18 and the remote room 14. Specifically, the caller 16 may designate a remote room 14 into the local user interface 38. The local user interface 38 communicates with the local room server 25, which is connected to the network 26. The remote room server 27 receives the call from the local user interface 38 and allows for one-way communication with the local room 18. Once one-way communication is established, the method includes a step 104 of transmitting the plurality of images of the caller 16 to the local room 18. Specifically, the plurality of images of the caller 16 are transmitted over the network 26 by the local room server 25 in real time to the remote room server 27. Further, the method includes a step 106 of displaying the plurality of images of the caller 16 in real time on the remote viewscreen 34 in the remote room 14. In other words, once received at the call remote room server 27, the plurality of images of the caller 16 are transmitted in real time to the remote user interface 36 and displayed on the remote viewscreen 34 in real time to allow the call receiver 12 to see a live video of the caller 16. Furthermore, the method includes a step 108 of establishing two-way communication between the local room 18 and the remote room 14. The method may further include a step 110 of transferring the plurality of images of the caller 16 from the remote viewscreen 34 to the remote display monitor 42 in the remote room 14 after two-way communication has been established.

Figure 4:
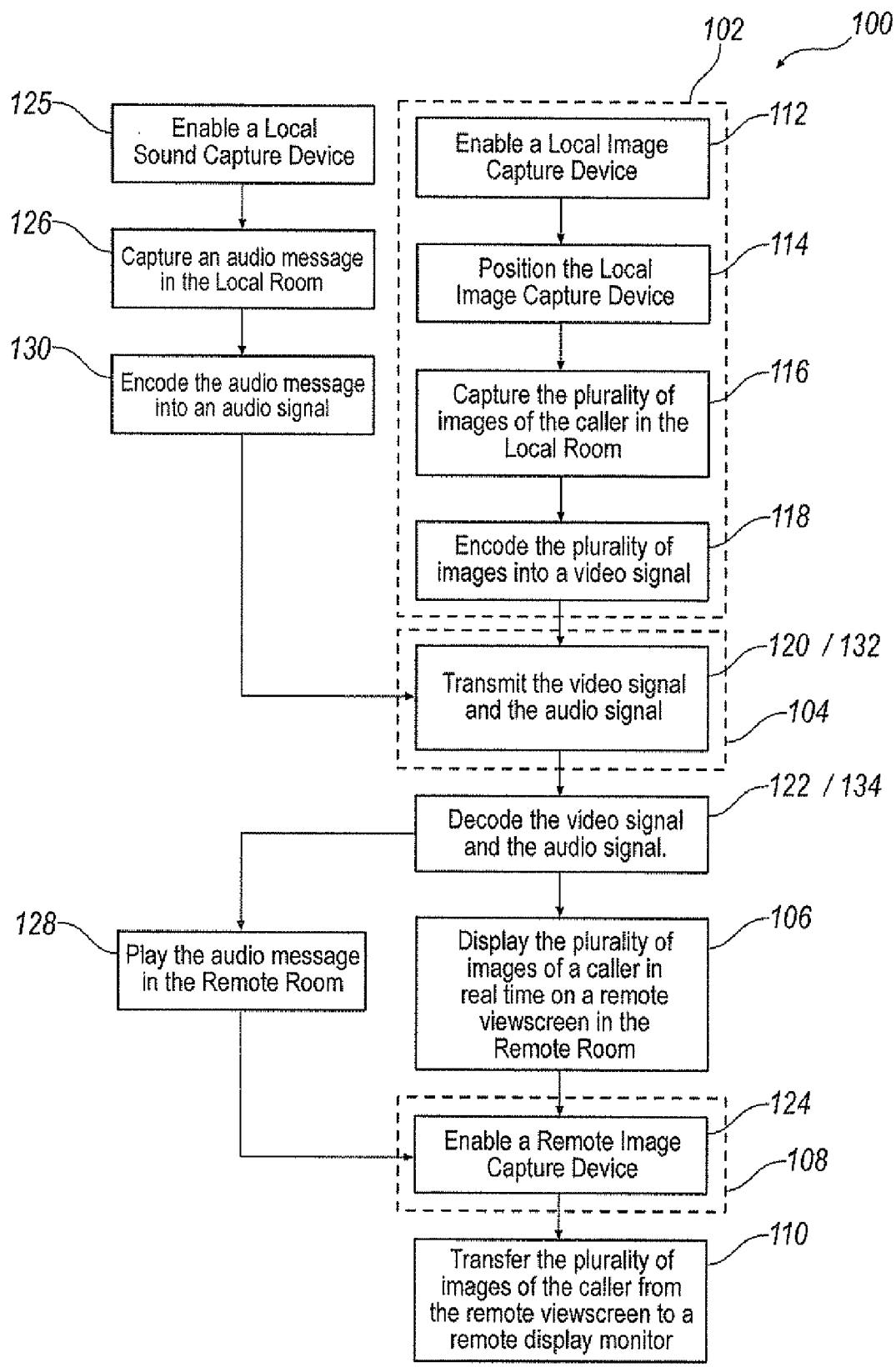
FIG. 4 is a flowchart of the method of FIG. 3 having additional steps according to an embodiment.

Referring now to FIG. 4, the step 102 of establishing one-way communication may be further defined as a step 112 of enabling the local image capture device 20, a step 114 of positioning the local image capture device 20, a step 116 of capturing the plurality of images of the caller 16 in the local room 18 in real time, and a step 118 of encoding the plurality of images into a video signal. In this embodiment, the step 104 of transmitting the plurality of images may be further defined as a step 120 of transmitting the video signal to the remote room 14, and the method 100 further includes a step 122 of decoding the video signal into the plurality of images of the caller 16. The step 108 of establishing two-way communication may be further defined as a step 124 of enabling the remote image capture device 24.

The method 100 may further include a step 125 of enabling the sound capture device, a step 126 of capturing an audio message in the local room 18, and a step 128 of playing the audio message in the remote room 14. The step 128 of playing the audio message may be simultaneous with the step 106 of displaying the plurality of images of the caller 16 in real time on the remote viewscreen 34. Before the step 128 of playing the audio message, the method 100 may include a step 130 of encoding the audio message into the audio signal. In this embodiment, the method 100 further includes a step 132 of transmitting the audio signal with the plurality of images of the caller 16. After being transmitted to the remote room 14, the method 100 may include a step 134 of decoding the audio signal into the audio message.

It is to be understood that the above description is intended to be illustrative and not restrictive. Many embodiments and applications other than the examples provided would be apparent to those skilled in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

We claim:

1. A method of determining the identity of a caller in a videoconferencing system, said method comprising, during one-way communication between a local room and a remote room:
    receiving a plurality of images of the caller from the local room to the remote room during the one-way communication;
    before establishing two-way communication, displaying the plurality of images of the caller in real time on a remote viewscreen in the remote room; and
    selectively establishing two-way communication between the local room and the remote room.

2. A method as set forth in claim 1 further comprising transferring the plurality of images of the caller from the remote viewscreen to a remote display monitor after two-way communication has been established.

3. A method as set forth in claim 1 further comprising establishing the one-way communication, including capturing the plurality of images of the caller in the local room in real time.

4. A method as set forth in claim 3 wherein establishing one-way communication includes encoding the plurality of images into a video signal.

5. A method as set forth in claim 1 further comprising, before establishing two-way communication, capturing an audio message in the local room.

6. A method as set forth in claim 5 further comprising, before establishing two-way communication, playing the audio message in the remote room.

7. A method as set forth in claim 6 wherein said step of playing the audio message is simultaneous with said step of displaying the plurality of images of the caller in real time on the remote viewscreen.

8. A method as set forth in claim 1 further comprising, before establishing two-way communication, encoding an audio message into an audio signal.

9. A method as set forth in claim 1 wherein said step of establishing two-way communication includes enabling a remote image capture device.

10. A videoconferencing system comprising:
    a local image capture device;
    a network in communication with said local image capture device;
    a remote codec in communication with said network; and
    a remote viewscreen in communication with said network for displaying a plurality of images of a caller in real time in a remote room during one-way communication between the remote room and a local room.

11. A videoconferencing system as set forth in claim 10 further comprising a remote display monitor, separate from said remote viewscreen, in communication with said remote codec for displaying the plurality of images of the caller in real time during two-way communication between the local room and the remote room.

12. A videoconferencing system as set forth in claim 10 further comprising a local codec in communication with said local image capture device and said network.

13. A videoconferencing system as set forth in claim 12 further comprising a local audio processor in communication with said local codec.

14. A videoconferencing system as set forth in claim 13 further comprising a local room server in communication with said local image capture device and said network and wherein said local audio processor is in communication with said local room server.

15. A videoconferencing system as set forth in claim 13 further comprising a local sound capture device in communication with said local audio processor.

16. A videoconferencing system as set forth in claim 10 further comprising a remote image capture device in communication with said remote codec.

17. A videoconferencing system as set forth in claim 10 further comprising a remote audio processor in communication with said remote codec.

18. A videoconferencing system as set forth in claim 17 further comprising a remote room server in communication with said network and said remote viewscreen and wherein said remote audio processor is in communication with said remote room server.

19. A videoconferencing system as set forth in claim 17 further comprising a remote sound capture device in communication with said remote audio processor.

20. A videoconferencing system comprising:
    a videoconferencing server with a network interface for communicating with a network;
    a user input interface for controlling the server to establish two-way communication between the videoconferencing system and a remote videoconferencing system, the user input interface comprising a viewscreen; and
    an image capture device and sound capture device in communication with server;
    wherein the server is programmed for receiving and displaying images of a caller from an image capture device at the caller's location, the images being displayed on the viewscreen when the caller is requesting connection of a call via the network and before the two-way communication is established.

21. The videoconferencing system of claim 20 further comprising a monitor separate from the viewscreen on which images of the caller are displayed after two-way communication is established.

22. The videoconferencing system of claim 20 wherein the user input interface comprises a telephone on which the viewscreen is disposed.

23. The videoconferencing system of claim 20 wherein the server is further programmed to receive an audio message from the caller before the two-way communication is established and to play that audio message on a speaker of the video conferencing system while the images of the caller are displayed on the viewscreen.

* * * * *